United States Patent
Kibbar et al.

(10) Patent No.: US 10,817,819 B2
(45) Date of Patent: Oct. 27, 2020

(54) WORKFLOW COMPILATION

(75) Inventors: Amir Kibbar, Petah Tiqwa (IL); Dmitry Rassin, Ashdod (IL)

(73) Assignee: Micro Focus LLC, Santa Clara, CA (US)

(*) Notice: Subject to any disclaimer, the term of this patent is extended or adjusted under 35 U.S.C. 154(b) by 1119 days.

(21) Appl. No.: 14/391,692

(22) PCT Filed: Jul. 16, 2012

(86) PCT No.: PCT/US2012/046931
§ 371 (c)(1),
(2), (4) Date: Oct. 9, 2014

(87) PCT Pub. No.: WO2014/014443
PCT Pub. Date: Jan. 23, 2014

(65) Prior Publication Data
US 2015/0106153 A1    Apr. 16, 2015

(51) Int. Cl.
G06Q 10/00    (2012.01)
G06Q 10/06    (2012.01)
G06F 8/34    (2018.01)
G06F 8/41    (2018.01)

(52) U.S. Cl.
CPC ......... G06Q 10/06316 (2013.01); G06F 8/34 (2013.01); G06F 8/41 (2013.01)

(58) Field of Classification Search
CPC .............................................. G06Q 10/06316
USPC ........................................................ 705/7.26
IPC ...................................................... G06Q 10/06
See application file for complete search history.

(56) References Cited

U.S. PATENT DOCUMENTS

| | | | | |
|---|---|---|---|---|
| 5,581,691 A | * | 12/1996 | Hsu | G06F 9/4494 714/15 |
| 5,774,661 A | * | 6/1998 | Chatterjee | G06F 9/5038 709/203 |
| 5,799,297 A | * | 8/1998 | Goodridge | G06Q 10/04 |
| 5,930,512 A | | 7/1999 | Boden | |
| 5,999,911 A | | 12/1999 | Berg | |
| 6,073,109 A | * | 6/2000 | Flores | G06Q 10/10 705/7.13 |
| 6,225,998 B1 | * | 5/2001 | Okita | G06F 8/34 707/999.102 |
| 6,253,369 B1 | * | 6/2001 | Cloud | G06F 9/546 717/136 |
| 6,286,129 B1 | * | 9/2001 | Agarwal | G06F 8/34 715/764 |
| 6,405,364 B1 | * | 6/2002 | Bowman-Amuah | G06Q 10/06 717/101 |
| 6,954,747 B1 | * | 10/2005 | Wang | G06F 8/71 706/1 |
| 7,712,088 B2 | * | 5/2010 | Sonkin | G06F 16/2379 717/136 |

(Continued)

FOREIGN PATENT DOCUMENTS

CN    101174219    5/2008

OTHER PUBLICATIONS

Jan Recker and Jan Mendling (On the Translation between BPMN and BPEL: Conceptual Mismatch between Process Modeling Languages, Jan. 2006).*

(Continued)

*Primary Examiner* — Hafiz A Kassim (57) ABSTRACT

A method includes compiling a workflow that is defined in a high-level flow language to generate a plurality of execution units that are executable so as to execute the workflow.

20 Claims, 4 Drawing Sheets

(56) References Cited

U.S. PATENT DOCUMENTS

| | | | | |
|---|---|---|---|---|
| 7,805,324 | B2* | 9/2010 | Green | G06Q 10/06 705/7.27 |
| 7,890,940 | B2* | 2/2011 | Komatsu | G06F 8/443 717/151 |
| 7,930,687 | B2 | 4/2011 | Moorthy et al. | |
| 8,214,795 | B2* | 7/2012 | Cheriton | G06F 9/4496 717/104 |
| 8,656,346 | B2* | 2/2014 | Kodi | G06Q 10/06 717/106 |
| 2001/0032108 | A1* | 10/2001 | Sieron | G06Q 10/06 717/100 |
| 2002/0161823 | A1 | 10/2002 | Casati et al. | |
| 2002/0170035 | A1* | 11/2002 | Casati | G06F 9/542 717/127 |
| 2002/0184610 | A1* | 12/2002 | Chong | G06F 8/20 717/109 |
| 2002/0188644 | A1* | 12/2002 | Seidman | G06Q 10/10 718/100 |
| 2003/0055668 | A1* | 3/2003 | Saran | G06F 9/546 705/301 |
| 2004/0078373 | A1* | 4/2004 | Ghoneimy | G06Q 10/10 |
| 2005/0028073 | A1 | 2/2005 | Henry et al. | |
| 2005/0050525 | A1* | 3/2005 | Chittar | G06F 8/51 717/136 |
| 2005/0149908 | A1* | 7/2005 | Klianev | G06F 9/5038 717/109 |
| 2005/0267889 | A1* | 12/2005 | Snyder | G06F 16/283 |
| 2006/0059253 | A1* | 3/2006 | Goodman | G06Q 10/06 709/223 |
| 2006/0074734 | A1* | 4/2006 | Shukla | G06Q 10/06 717/107 |
| 2006/0074736 | A1* | 4/2006 | Shukla | G06Q 10/06 717/100 |
| 2007/0157163 | A1* | 7/2007 | Nissen | G06F 8/34 717/106 |
| 2008/0178146 | A1* | 7/2008 | Koehler | G06F 8/10 717/106 |
| 2008/0189683 | A1* | 8/2008 | Payette | G06F 8/41 717/114 |
| 2008/0307490 | A1 | 12/2008 | Van Wyk et al. | |
| 2009/0070121 | A1* | 3/2009 | Leonelli | G06Q 10/06 705/301 |
| 2009/0083632 | A1 | 3/2009 | Brosh et al. | |
| 2009/0113387 | A1* | 4/2009 | Ziegler | G06Q 30/0244 717/109 |
| 2009/0125878 | A1* | 5/2009 | Cullum | G06F 8/51 717/106 |
| 2009/0187453 | A1* | 7/2009 | Dill | G06Q 10/0631 705/7.12 |
| 2009/0217248 | A1 | 8/2009 | Bently et al. | |
| 2010/0106551 | A1* | 4/2010 | Koskimies | G06Q 10/10 156/1 |
| 2010/0205588 | A1 | 8/2010 | Yu et al. | |
| 2011/0208634 | A1* | 8/2011 | Sylvester | G06Q 40/04 705/37 |
| 2012/0059683 | A1* | 3/2012 | Opalach | G06Q 10/06 705/7.27 |
| 2012/0110583 | A1* | 5/2012 | Balko | G06F 9/4843 718/102 |
| 2013/0117747 | A1* | 5/2013 | Balko | G06F 9/485 718/100 |
| 2013/0139164 | A1* | 5/2013 | Balko | G06F 8/35 718/102 |

OTHER PUBLICATIONS

Wilfrid Utz, Robert Woitsch, and Dimitris Karagiannis (Conceptualisation of Hybrid Service Models—An Open Models Approach, 35th IEEE Annual Computer Software and Applications Conference Workshops, 2011). (Year: 2011).*

Clarence A. Ellis (Workflow Technology, Computer Supported Cooperative Work, Edited by Beaudouin-Lafon, 1999 JohnWiley & Sons Ltd). (Year: 1999).*

Recker, Jan and Mendling, (On the Translation between BPMN and BPEL. Proceedings of Workshops and Doctoral Consortiums, pp. pp. 521-532—Jan. 2006) (Year: 2006).*

Dijkman, Remco M., Dumas, Marlon, & Ouyang, Chun (Semantics and analysis of business process models in BPMN. Information and Software Technology, 50(12), pp. 1281-1294 (2008)). (Year: 2008).*

Jeff Barr, Amazon Simple Workflow—Cloud-based Workflow Management, AWS Official Blog, Feb. 21, 2012, 12 pages.

Mohan, R., et al, A State Machine Approach for a Process Driven Development of Web-Applications, Security in Communication Networks: Third International Conference, vol. 2348, Jan. 1, 2002, pp. 52-66.

Sérgio Miguel Fernandes et al, Supporting Evolution in Workflow Definition Languages, SOFSEM 2004, LNCS 2932, Jan. 1, 2004 (Jan. 1, 2004), pp. 208-217.

Supplementary European Search Report, European Patent Application No. 12881266.6, dated Feb. 2, 2016, 9 pages.

Hentrich; "A Pattern Language for Process Execution and Integration Design in Service-Oriented Architectures"; Transactions on Pattern Language of Programming, vol. 1, 2009, pp. 103-135.

Korean Intellectual Property Office, International Search Report, dated Mar. 22, 2013, 9 pages, Daejeon Metropolitan City, Republic of Korea.

* cited by examiner

WORKFLOW COMPILATION

BACKGROUND

A workflow management application may be designed to enable a user to automate a workflow. The user may define the workflow that may then be executed automatically by the workflow management application.

Such a workflow management application may provide a graphical user interface that enables a user with limited or no programming skills to correctly define the workflow. For example, the user may select steps of the workflow from a menu and define connections among the steps. The selection and connection may be done in a graphical manner. In some such applications, the user may graphically select and drag one or more blocks that represent steps into a region of a user interface. Connections between the blocks may be drawn to represent various connections or transitions between steps of the workflow.

For example, a workflow may check for communication with a server. In such a workflow, a signal may be transmitted via a communications channel to a server. A response signal from the server ("ping") may be received (or not, if the server or the communications channel is not functional). A response time between transmission of the signal and reception of the response may be measured. The measured response time may be compared with a timeout value. In the event that the measured time exceeds the timeout value, corrective action may be performed. For example, the corrective action may include rebooting the server. Thus, in defining this workflow, a user interface may include a block to represent sending and receiving the signal, a block representing a comparison between the measured response time and the timeout value, and blocks to represent operations in the event of timing out (e.g. rebooting) and in the event of receiving the response before the timeout (e.g. ending the workflow or performing). Connections defined or drawn by the user may define the order of the steps.

DETAILED DESCRIPTION

In accordance with examples of workflow compilation, a workflow is defined for a workflow management application in terms of flow objects or steps. Various steps of the workflow may be defined by a user. Steps may include, for example, activities, events, or gateways (e.g. decision, or other forking or merging of flow paths).

A step may defined by a user using a high-level flow language. A high-level flow language may include a standard flow language such as, for example, Advance Flow Language (AFL), Process Definition Language (XPDL), Yet Another Workflow Language (YAWL), Business Process Execution Language (BPEL), or Business Process Model and Notation (BPMN). A high-level flow language may include a proprietary flow language e.g., that is associated with a particular workflow application or engine. Various steps of the workflow may be written in different flow languages. For example, a user that defines a workflow using a workflow engine may incorporate into the workflow various steps that had been previously defined using different workflow engines or applications.

A workflow management application that applies an example of workflow compilation as described herein may provide a user interface for graphical definition of a workflow. A user may thus operate the graphical user interface so as to define the workflow in the form of steps. The workflow management application may include a library of types of steps and relationships among steps. For example, a user interface may enable a user to graphically select or manipulate screen objects that represent various types of steps for inclusion in the workflow.

A user interface of a workflow management application may further enable a user to define connections among the steps, e.g. by connecting the screen objects that represent the steps with a selected connector that represents a connection (e.g. sequence flow showing an order of execution, flow of a message or information, or other association). The user interface may enable a user to input data that characterizes a step or a connection.

An appropriate interpreter or similar application may interpret a graphically described workflow in terms of a high-level flow language. In other examples, a user may directly write commands in a high-level flow language so as to define the workflow. Tools may be provided to assist a user who is not familiar with the high-level flow language to define a step or to modify a workflow.

Various defined steps of the workflow may be executed by different "workers," e.g. by different machines, by different execution modules within a single machine, or by various instances of programs or applications that are running on a single machine. In some examples of workflows, two or more steps may be executed in parallel while in others, steps are executed sequentially.

A step of the workflow may include a series of sub-operations or tasks that are to be executed as part of the step. The high-level flow language may be designed such that a user that defines the workflow need not be aware of those individual tasks. For example, a single step may include a pre-processing phase during which preparation is made to execute an action, a phase in which the action is executed, an post-processing phase in which results of the action are processed, and a transition phase that leads to execution of the next step. Each of these phases, in turn, may include multiple tasks. For example, tasks in a phase may include locating data required for execution of the phase, applying filters to the data, processing outcomes or results, and running various scripts.

For example, a simple workflow may check whether a server is responding, and take corrective action if it is not. This simple workflow may include a step that represents performing a ping operation (transmitting a signal to the server and measuring the time until a response is received from the server, if at all), a step that represents comparing the response time with an acceptable value, and a step that represents restarting the server. Workflow relationships may indicate that the comparison step is to follow the ping step, and that the restarting step is to be performed depending on the result of the comparison step.

In accordance with examples of workflow compilation, a workflow is compiled to a representation that is referred to herein as an "execution plan". The execution plan includes a series of execution units. A single execution unit may represent a particular sub-operation or task of a step of the workflow. Compilation of the workflow may be performed by a compiler module of a workflow management system. Execution units of the workflow are selected from a limited library of execution units. The execution units in the library each represent a basic operation that could be combined into a step. A compiler module may analyze each step (or phase of a step) and identify the execution units that are to be executed in order to execute the step.

A compiler may be provided for each flow language that is supported by a workflow manager application. Thus, a workflow management system that implements an example of workflow compilation may handle workflow steps that are defined in a plurality of flow languages. The workflow management system then handles execution units that are generated by compilation of a workflow step that is defined in any of the supported flow languages in a substantially identical manner.

The workflow management system may be adapted to support an additional flow language that was not previously supported. Support for the additional flow language may be added to the workflow management system by creation of a compiler for the additional flow language. Thus, a step that is defined by any supported flow language may be compiled to execution units of an execution plan.

Similarly, a workflow management system that implements an example of workflow compilation may be adapted to correctly execute a previously undefined type of step. For example, a compiler may be modified to compile a previously undefined type of step (e.g. a step that involves a new type of operation or device that had not been utilized in previous workflows). Thus, adapting the workflow management system to a new or previously undefined type of step may only require modification of the compiler. The new type of step could then be compiled to an execution plan in the form of previously defined execution units. Thus, when the step is incorporated into the modified compiler, no further modification of the workflow management system would be entailed in order to adapt the workflow management system to the new type of step.

Once a workflow is compiled, the compiled workflow may be executed by a processor or system that is configured to execute execution plans. Thus, a compiled workflow may be made available to a system that is not provided with a suitable compiler. (This may be considered to be analogous to creation of an executable file from a program that is written in a high-level programming language. Such an executable file may be executed on any suitably configured machine, whether or not that machine is provided with compilation capability.)

Figure 1:
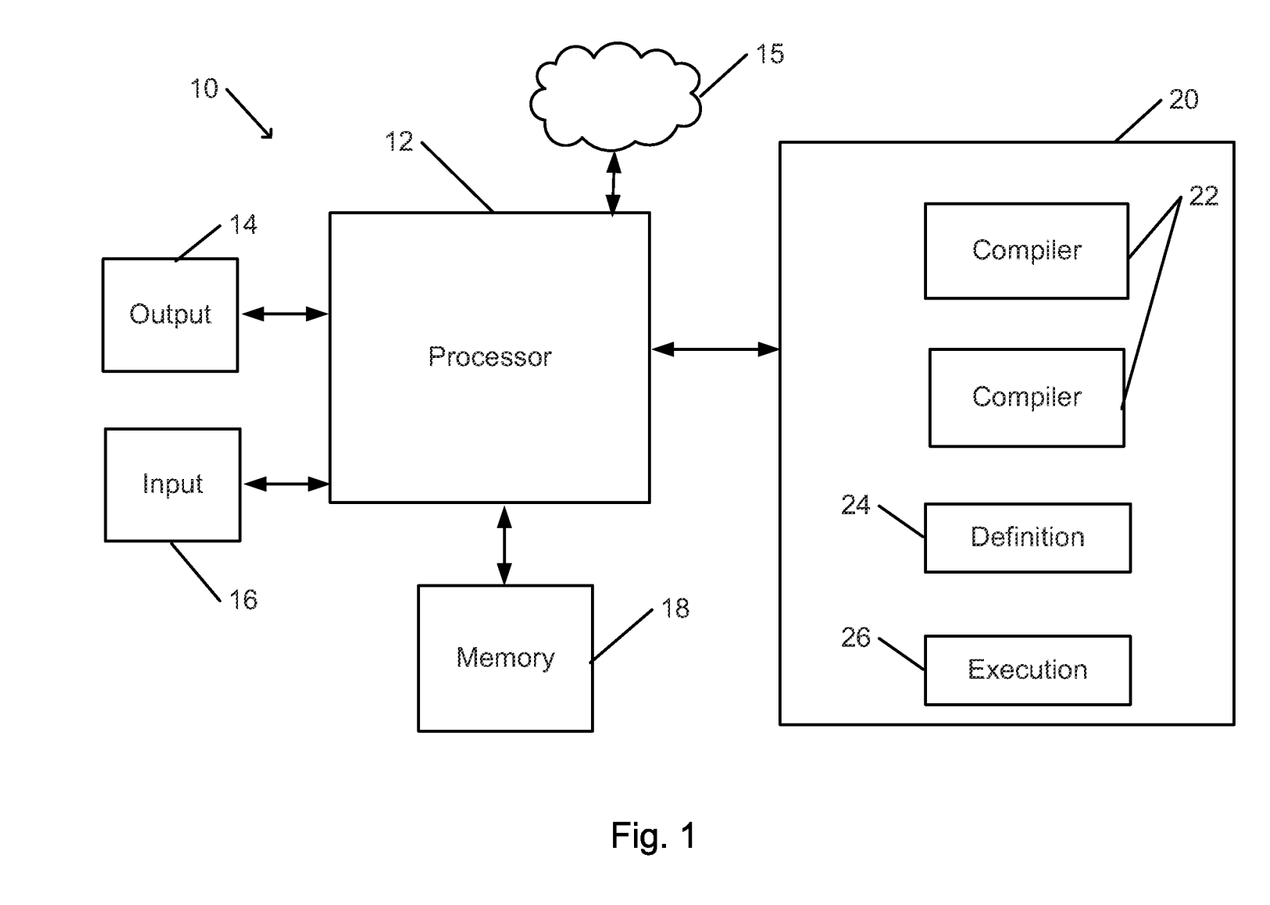
FIG. 1 is a schematic illustration of a system for workflow management that implements an example of workflow compilation.

A system may be configured to implement workflow management that implements an example of workflow compilation. FIG. 1 is a schematic illustration of a system for workflow management that implements an example of workflow compilation. Workflow management system 10 includes a processor 12. For example, processor 12 may include one or more processing units, e.g. of one or more computers. Various processing units of processor 12 may be interconnected, or may intercommunicate via a communications channel, such as network 15. Processor 12 may be configured to operate in accordance with programmed instructions stored in memory 18. Processor 12 may be capable of executing an application for workflow management that implements workflow compilation, Processor 12 may communicate with output device 14. For example, output device 14 may include a computer monitor or screen. Processor 12 may communicate with a screen of output device 14 to display a result or progress of a managed workflow. Processor 12 may communicate with a screen of output device 14 to display elements of a user interface for enabling a user to define a workflow. In another example, output device 14 may include a printer, display panel, speaker, or another device capable of producing visible, audible, or tactile output.

Processor 12 may communicate with input device 16. For example, input device 16 may include one or more of a keyboard, keypad, or pointing device for enabling a user to inputting data or instructions for operation of processor 12, A user may operate input device 16 so as to define a workflow, or to initiate or control execution of a workflow.

Processor 12 may communicate with one or more external devices via a communications channel that is represented by network 15.

Processor 12 may communicate with memory 18. Memory 18 may include one or more volatile or nonvolatile memory devices. Memory 18 may be utilized to store, for example, programmed instructions for operation of processor 12, data or parameters for use by processor 12 during operation, or results of operation of processor 12. For example, processor 12 may be utilized to store execution units that result from compilation of a workflow by processor 12.

Processor 12 may communicate with data storage device 20. Data storage device 20 may include one or more fixed or removable nonvolatile data storage devices. For example, data storage device 20 may include a computer readable medium for storing program instructions for operation of processor 12. In this example, the programmed instructions may take the form of a compiler module 22 for compiling a defined workflow to form an execution plan, workflow definition module 24 for defining a workflow, or execution module 26 for executing a compiled execution plan. It is noted that storage device 20 may be remote from processor 12. In such cases storage device 20 may be a storage device of a remote server storing compiler module 22, definition module 24, or execution module 26 in the form of an installation package or packages that can be downloaded and installed for execution by processor 12. Data storage device 20 may be utilized to store data or parameters for use by processor 12 during operation, or results of operation of processor 12.

A plurality of compiler modules 22 may be stored. For example, each separate compiler module 22 may be configured to compile a workflow step that is defined in a particular supported flow language. Thus, a separate compiler module 22 may be provided for each supported flow language.

In operation, processor 12 may execute a method for workflow management that implements workflow compilation.

Figure 2:
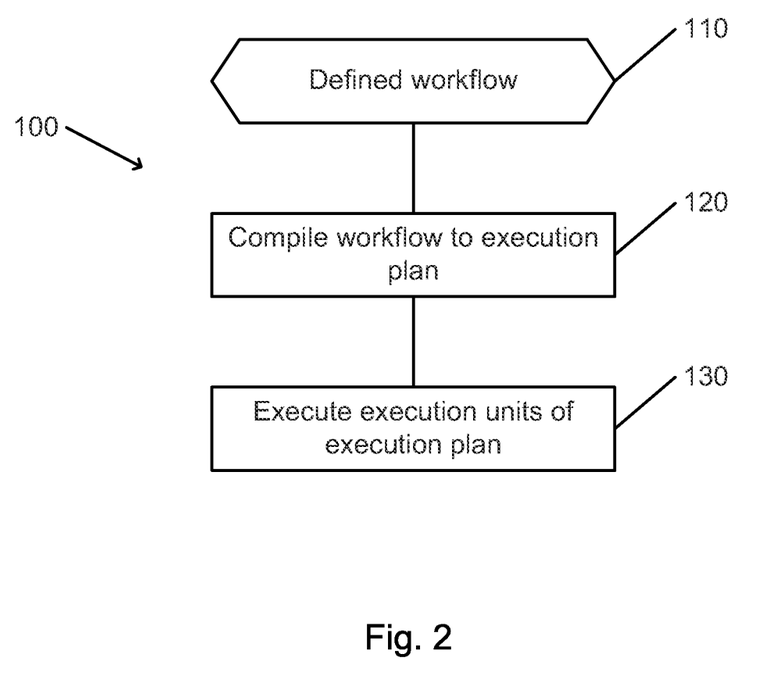
FIG. 2 is a flowchart depicting an example of a method for workflow management that implements workflow compilation.

FIG. 2 is a flowchart depicting an example of a method for workflow management that implements workflow compilation. Workflow management method 100 may be executed by a processor of a system for workflow management implementing workflow compilation. Workflow management method 100 may be executed upon a request or command that is issued by a user, or automatically issued by another application that is running on a processor.

For example, workflow management method 100 may be executed when a user has defined a workflow and has instructed a workflow management system to execute the defined workflow, or to prepare the workflow for execution.

It should be understood with respect to flowcharts that are referenced herein that the division of an illustrated method into discrete operations represented by blocks of the flowchart has been selected for convenience and clarity only. Alternative division of the illustrated method into discrete operations is possible with equivalent results. Such alternative division of an illustrated method into discrete operations should be understood as representing other examples of the illustrated method.

Similarly, it should be understood that, unless indicated otherwise, an illustrated order of execution of the operations represented by blocks of a flowchart has been selected for convenience and clarity only. Operations of the illustrated method may be executed in an alternative order, or concurrently, with equivalent results. Such reordering of operations of the illustrated method should be understood as representing other examples of the illustrated method.

Workflow management method 100 may be applied to a defined workflow (block 110). The defined workflow may include one or more workflow steps that were defined using one or more flow languages that are supported by the workflow management system. The workflow may be defined by a user or automatically by an application that is running on a processor of a system.

A defined step of the workflow may include one or more sub-processes or phases. These phases may not be made explicitly apparent to a user that defines the workflow. For example, a defined step may include a pre-processing phase during which preparation is made to execute an action, a phase in which an action is executed, a post-processing phase in which results of the action are processed, and a transition phase that leads to execution of anther step of the workflow.

One or more steps of the workflow may be compiled to yield execution units of an execution plan (block 120). For example, each phase of a step may be compiled to a sequence of standard execution units. An execution unit may include a single task of a step or phase that includes multiple tasks. A single execution unit may include a task that is common to many types of steps or phases. An execution unit itself may include a plurality of operations that are defined in a lower level language (e.g. machine language or assembly language instructions).

For example, an execution unit may include a task such as binding input (e.g. importing input from a particular location), processing a filter on data, processing a scriptlet (or other defined operation), or processing a result.

Although a step may be defined in any supported flow language, compilation of the step creates an execution plan that is specified in terms of a common set of execution units. Thus, steps that are defined in multiple flow languages may be compiled into execution units that are interpretable by any workflow management system that is configured to operate on compiled workflow steps.

The execution units of the execution plan may be executed so as to automatically run the defined and compiled workflow (block 130). The execution plan may be executed by a machine or system that is configured to execute an execution unit. For example, the execution units of the execution plan may be executed in an order that is specified by the execution plan. Various portions of the execution plan (e.g. corresponding to different steps of the workflow, or to different phases of a workflow step) may be executed by different workers (e.g. different machines, or different instances of an application that are running on a single machine).

A machine or system that executes execution units of an execution plan need not be provided with a compiler or compilation capability. Thus, a compiled execution plan may be made available to a user that is not provided with capability to define or compile a workflow. For example, a compiled execution plan may be made available to a subscriber to a service. A subscriber to the service may be provided with a capability to execute an execution plan. The subscriber may then access a compiled execution plan via a network. The subscriber may then run the execution plan or install the execution plan so as to run automatically.

An execution unit of an execution plan may include information that enables execution of the execution unit by a processor that is configured to execute execution units. For example, an execution unit may include an identifier that uniquely identifies the execution unit (e.g. to enable referencing to this execution unit by other execution units). The execution unit includes a reference to an action that is to be performed during execution of the execution unit. The execution unit may also include a transition reference to another execution unit that is to be executed upon completion of execution the action.

Figure 3:
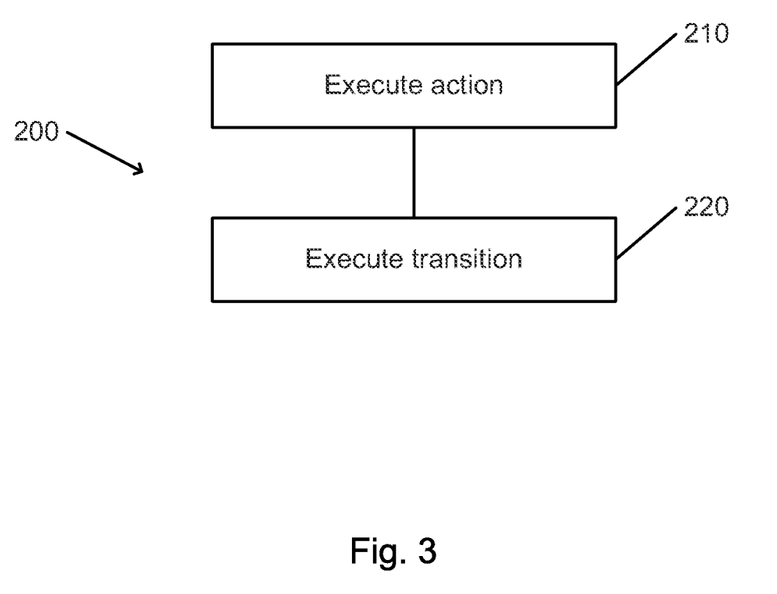
FIG. 3 is a flowchart depicting an example of execution of an execution unit that was generated by compilation of a workflow.

FIG. 3 is a flowchart depicting an example of execution of an execution unit that was generated by compilation of a workflow.

Workflow execution method 200 may be executed by a processor of a system for workflow management that is configured to execute a compiled workflow in the form of an execution plan. Workflow execution method 200 may be executed upon a request or command that is issued by a user, or automatically issued by another application that is running on a processor.

For example, workflow execution method 200 may be executed when a user or application has instructed a workflow management system to execute a compiled workflow. Workflow execution method 200 may be executed in connection with an execution unit of an execution plan when execution of the execution plan indicates that a current execution unit is to be executed.

An action that is referenced or otherwise indicated by content of the execution unit may be executed (block 210). For example, the action may include a single task of a workflow step or of a phase of a workflow step.

A transition that is referenced or otherwise indicated by content of the execution unit may be executed (block 220). The executed transition may reference an identifier that is associated with another execution unit, or otherwise indicate a next execution unit that is to be executed after the current execution unit. For example, a pointer or other indicator of a current execution unit may be modified so as to reference that next execution unit.

Execution of workflow execution method 200 may then be repeated with reference to that located next execution unit. Workflow execution method 200 may be repeated until the execution plan has reached a termination point.

Examples of workflow compilation may be illustrated with an example.

Figure 4A:
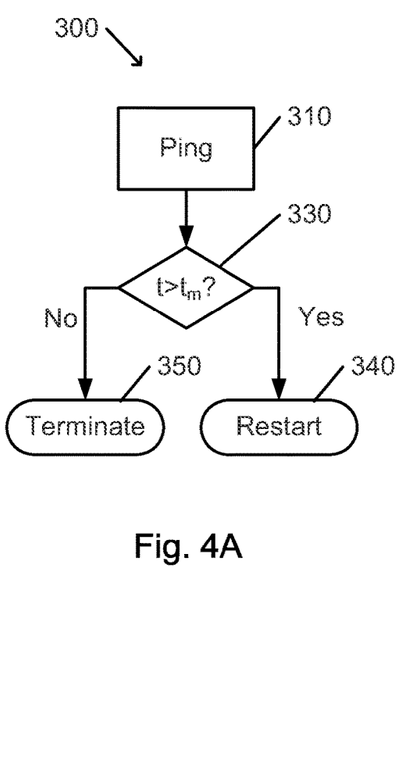
FIG. 4A depicts an example of a defined workflow.

FIG. 4A depicts an example of a defined workflow. Workflow 300 is defined in terms of workflow steps. Workflow step 310 represents a ping operation, in which a signal is transmitted over a connection or network and the time t to receiving a response is measured. In workflow step 330, the measured time t is compared to a maximum value, $t_m$. Workflow step 340 illustrates that if measured time t exceeds the value $t_m$, the system that is expected to send the response (e.g. a server) is restarted (e.g. rebooted). Workflow step 350 illustrates that if measured time t does not exceed the value $t_m$, the workflow is terminated.

Figure 4B:
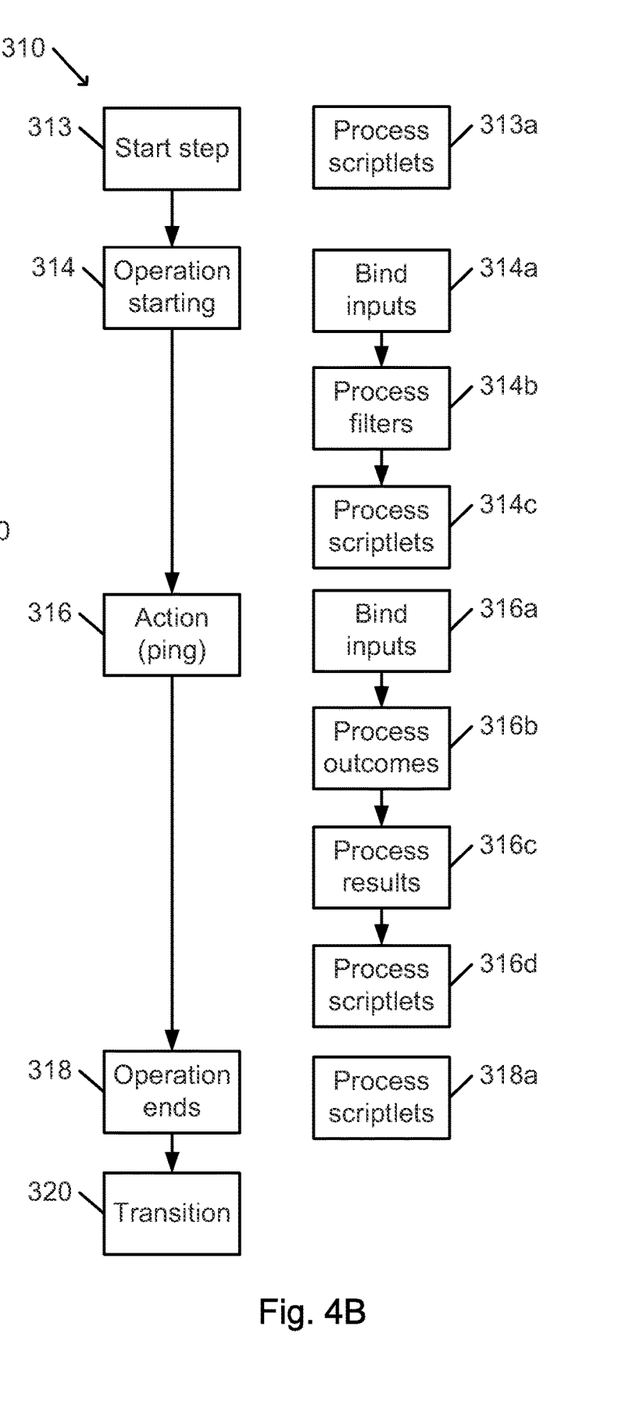
FIG. 4B depicts an example of division of the workflow depicted in FIG. 4A into smaller parts.

FIG. 4B depicts an example of division of the workflow depicted in FIG. 4A into smaller parts. In particular, workflow step 310 (ping) is illustrated as divided into phases 313 through 320. Some of the phases are illustrated as divided into tasks (each indicated by an alphabetic character that is appended to the numeral that labels the corresponding phase). Each task may represent an execution unit, or a collection of similar execution units.

For example, phase 313 (corresponding to starting workflow step 310) includes processing one or more scriptlets or commands (task 313a), Phase 314 (corresponding to starting the operation of workflow step 310) includes binding (locating and obtaining) one or more inputs (task 314a), processing one or more filters (e.g. for selecting from among outputs of an action; task 314b), and processing one or more scriptlets (task 314c). Phase 316 (corresponding to executing the ping action) includes binding one or more inputs (task 316a), processing (e.g. selecting of filtering) one or more outcomes (e.g. time-to-live, latency) of the ping action (task 316b), processing one or more results (e.g. a selected outcome) of the ping action that are to be output by workflow step 310 (task 316c), and processing one or more scriptlets (task 316d). Phase 318 (corresponding to ending the ping operation of workflow step 310) includes processing one or more scriptlets (task 318a).

Phase 320 corresponds to transitioning to the next step (e.g. workflow step 330) of workflow 300, in which it is determined which step of the workflow is to be executed next.

Although the above example refers to workflow compilation with regard to workflow steps for testing connectivity, examples of workflow compilation may be applied to other workflows and workflow steps. Further examples of workflow steps to which workflow compilation may be applied include opening a ticket in a ticketing system, copying a file from one machine to another, or rebooting a machine. Further examples of workflows to which workflow compilation may be applied include workflows that may be connected to providing a virtual machine, such as creating a virtual machine, installing an operating system on a virtual machine, connecting a virtual machine to a network (e.g. including assigning an Internet Protocol address or creating initial administrator credentials).

In accordance with an example of workflow management implementing workflow compilation, a computer program application stored in a computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein, such as an example of a method for workflow management implementing workflow compilation. The computer-readable medium may be a non-transitory computer-readable media including all forms and types of computer-readable media except for a transitory, propagating signal.

We claim:

1. A method comprising:
receiving, in a user interface of a computing device, a workflow comprising a first flow object and a second flow object linked by a flow connector, wherein the first flow object is defined in a first high-level flow language, and wherein the second flow object is defined in a second high-level flow language;
in response to a receipt of the workflow:
compiling, by a first compiler, the first flow object to generate a first plurality of execution units, and
compiling, by the first compiler, the second flow object to generate a second plurality of execution units, wherein the first plurality of execution units and the second plurality of execution units are executable to execute the workflow, and wherein, in the first plurality of execution units and the second plurality of execution units, each execution unit is a data object that comprises:
a first identifier that uniquely identifies a next execution unit to be executed,
a second identifier that uniquely identifies the execution unit, and
a third identifier that uniquely identifies a particular action to be executed.

2. The method of claim 1, further comprising:
executing the first plurality of execution units and the second plurality of execution units in a sequence to execute the workflow.

3. The method of claim 2, wherein the sequence of the first plurality of execution units and the second plurality of execution units is defined as an execution plan.

4. The method of claim 1, further comprising:
selecting, by the first compiler, the first plurality of execution units from a limited library of execution units; and
selecting, by the first compiler, the second plurality of execution units from the limited library of execution units.

5. The method of claim 4, wherein:
selecting the first plurality of execution units comprises analyzing the first flow object; and
selecting the second plurality of execution units comprises analyzing the second flow object.

6. A non-transitory computer readable storage medium having stored thereon instructions that when executed by a processor will cause the processor to:
receive, in a user interface, a workflow comprising a first flow object and a second flow object, wherein the first flow object is defined in a first high-level flow language, and wherein the second flow object is defined in a second high-level flow language;
in response to a receipt of the workflow:
compile, by a first compiler, the first flow object to generate a first plurality of execution units, and
compile, by the first compiler, the second flow object to generate a second plurality of execution units, wherein the first plurality of execution units and the second plurality of execution units are executable to execute the workflow, and wherein, in the first plurality of execution units and the second plurality of execution units, each execution unit is a data object that comprises a first identifier that uniquely identifies a next execution unit to be executed.

7. The non-transitory computer readable storage medium of claim 6, further comprising instructions that when executed cause the processor to execute the first plurality of execution units and the second plurality of execution units in a sequence to execute the workflow.

8. The non-transitory computer readable storage medium of claim 7, wherein the sequence of the first plurality of execution units and the second plurality of execution units is defined as an execution plan.

9. The non-transitory computer readable storage medium of claim 6, wherein each execution unit of the first plurality of execution units is a particular task associated with the first flow object, and wherein each execution unit of the second plurality of execution units is a particular task associated with the second flow object.

10. The non-transitory computer readable storage medium of claim 6, wherein each execution unit of the first plurality of execution units and the second plurality of execution units further comprises:
   a second identifier that uniquely identifies the execution unit, and
   a third identifier that uniquely identifies a particular action to be executed.

11. The non-transitory computer readable storage medium of claim 6, comprising instructions to provide the user interface that is operable by a user to define the workflow.

12. The non-transitory computer readable storage medium of claim 6, further comprising instructions that when executed cause the processor to:
   select, by the first compiler, the first plurality of execution units from a limited library of execution units; and
   select, by the first compiler, the second plurality of execution units from the limited library of execution units.

13. A system comprising:
   a processor in communication with a non-transitory computer readable medium, wherein the non-transitory computer readable medium contains a set of instructions executable by the processor to:
      receive, in a user interface, a workflow comprising a first flow object and a second flow object, wherein the first flow object is defined in a first high-level flow language, and wherein the second flow object is defined in a second high-level flow language;
      in response to a receipt of the workflow:
      compile, by a first compiler, the first flow object to generate a first plurality of execution units, and
      compile, by the first compiler, the second flow object to generate a second plurality of execution units, wherein the first plurality of execution units and the second plurality of execution units are executable to execute the workflow, and wherein, in the first plurality of execution units and the second plurality of execution units, each execution unit is a data object that comprises a first identifier that uniquely identifies a next execution unit to be executed.

14. The system of claim 13, wherein the set of instructions includes instructions to execute the first plurality of execution units and the second plurality of execution units.

15. The system of claim 13, wherein an execution unit of the first plurality of execution units and the second plurality of execution units comprises:
   a second identifier that uniquely identifies the execution unit, and
   a third identifier that uniquely identifies a particular action to be executed.

16. The system of claim 13, wherein the set of instructions includes instructions to execute the first plurality of execution units and the second plurality of execution units in a sequence to execute the workflow.

17. The system of claim 13, wherein each execution unit of the first plurality of execution units is a particular task associated with the first flow object.

18. The system of claim 17, wherein the set of instructions include instructions to provide the user interface that enables a user to define the workflow.

19. The system of claim 13, wherein the first compiler is to select the first plurality of execution units and the second plurality of execution units from a limited library of execution units.

20. The system of claim 13, wherein the first compiler is to:
   select the first plurality of execution units based on an analysis of the first flow object; and
   select the second plurality of execution units based on an analysis of the second flow object.

\* \* \* \* \*